No. 637,184. Patented Nov. 14, 1899.
J. D. THOMAS.
VEHICLE STEP.
(Application filed Aug. 29, 1899.)
(No Model.)
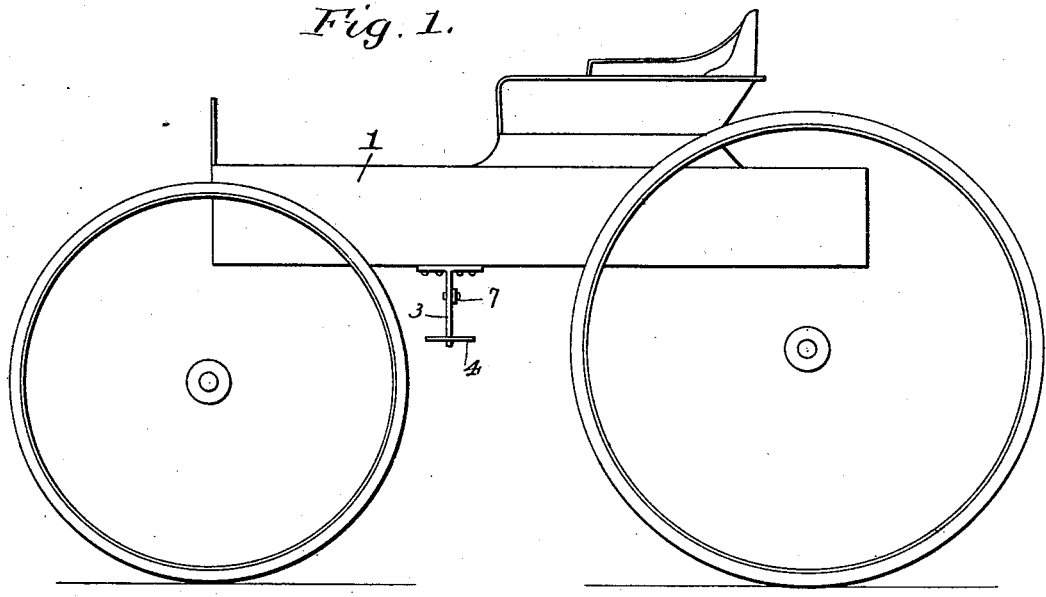
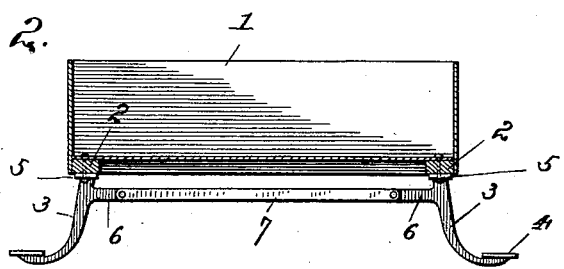
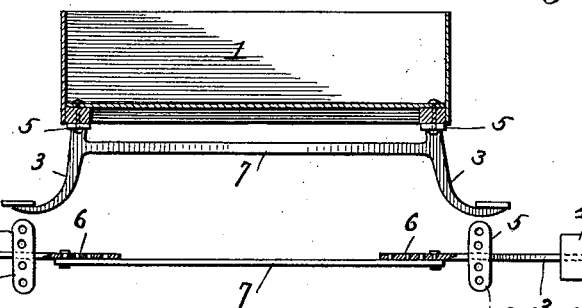
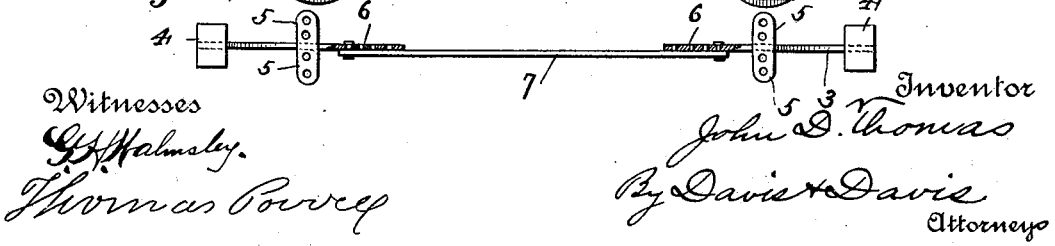
Witnesses
G. F. Walmsley.
Thomas Powey
Inventor
John D. Thomas
By Davis & Davis
Attorneys

UNITED STATES PATENT OFFICE.

JOHN D. THOMAS, OF KATONAH, NEW YORK.

VEHICLE-STEP.

SPECIFICATION forming part of Letters Patent No. 637,184, dated November 14, 1899.

Application filed August 29, 1899. Serial No. 728,877. (No model.)

*To all whom it may concern:*

Be it known that I, JOHN D. THOMAS, a citizen of the United States, and a resident of Katonah, county of Westchester, State of New York, have invented certain new and useful Improvements in Vehicle-Steps, of which the following is a specification, reference being had therein to the accompanying drawings, in which—

Figure 1 is a side elevation of a carriage. Fig. 2 is a transverse sectional view thereof. Fig. 3 is a similar view showing a modification of the steps, and Fig. 4 is a plan view of a pair of the steps.

The invention has for its object to provide a pair of vehicle-steps which are adapted to be rigidly secured to the running-gear or to the vehicle-body and to be rigidly fastened to each other by a bar running under the body of the vehicle, whereby the body is provided with a rigid brace, and all strains brought on either step will be taken up by the fastenings of both steps, thus rendering the undesirable independent braces from each step to the carriage-body unnecessary.

Referring to the various parts by numerals, 1 designates the carriage-body, which may be of any desired form, and 2 the longitudinal bars or sills thereof. Bolted rigidly to each of these sills at diametrically opposite points is a depending outward-curving step iron or bracket 3, which carries at its outer lower end the step-piece 4. The upper ends of the step-irons are formed with the lateral flanges 5, through which the bolts pass which secure the step to the sills of the vehicle-body.

Extending inward from the inner edge of each of the step-irons, slightly below its upper end, is an arm 6, through the inner end of which are formed a series of horizontal bolt-holes. Securely bolted against the sides of these arms is a stiff bar 7. This stiff bar rigidly connects the two arms 6 and braces the steps against each other and causes any strain placed directly on either step to be taken up by the fastenings of both steps. This is of great advantage, especially in light vehicles, where the steps are fastened to the strongest part of the body—that is, the sills—and where it is undesirable to fasten independent braces to each step-iron and to the thin bottom or other portion of the vehicle. Each step is rigidly braced to the other sill, and this is accomplished with only one set of fastening-bolts for each step. It will be noted that by utilizing the bolts which secure one step-iron to its sill to brace the step-iron secured to the opposite sill each set of bolts serves a double purpose. It will also be noted that securing the steps together in this manner aids in preventing any twisting of the vehicle-body when a great strain is brought on either step.

By means of the series of holes in the inner ends of the arms 6 the steps may be adjusted to vehicle-bodies of various width. Instead of forming the bar 7 separate and bolting it to arms 6 it may be formed integral with the arms 3 and permanently connect them together.

Having thus fully described my invention, what I claim, and desire to secure by Letters Patent, is—

1. A pair of vehicle-steps comprising a pair of step-irons adapted to be bolted to a portion of a vehicle, a rigid bar connecting said step-irons at their inner edges, and a step-piece carried by each step-iron.

2. A pair of vehicle-steps comprising a pair of step-irons adapted to be bolted to a portion of a vehicle, a rigid bar adjustably connecting said step-irons, whereby the steps may be applied to vehicles of various width, and a step-piece carried by each step-iron.

3. A pair of vehicle-steps comprising a pair of step-irons adapted to be bolted to a portion of a vehicle, an inward-extending arm formed integral with each step-iron and provided with a series of bolt-holes, and a rigid bar adapted to be bolted to said inward-extending arms to rigidly connect the step-irons together, and a step-piece carried by each step-iron.

4. The combination of a vehicle having rigid longitudinal bars, step-irons bolted to said bars and extending downward and outward, a stiff bar rigidly connecting said step-irons slightly below the vehicle-body, whereby a strain put on one step will be taken up by the fastening means of both steps and whereby the stiff bar will form a strong lateral brace for said longitudinal vehicle-bars, and a step-piece for each step-iron.

In testimony whereof I hereunto affix my signature, in the presence of two witnesses, this 26th day of August, 1899.

JOHN D. THOMAS.

Witnesses:
J. H. WILLIAMS,
WILLIAM G. BARRETT.